Nov. 12, 1940.  R. WUSSOW ET AL  2,221,212
REFRIGERATING APPARATUS
Filed July 26, 1937  2 Sheets-Sheet 1

Inventors
Reinhard Wussow
Fritz W. Fechner
By Arthur Simon
Attorney

Nov. 12, 1940.                  R. WUSSOW ET AL                     2,221,212
                              REFRIGERATING APPARATUS
                              Filed July 26, 1937      2 Sheets-Sheet 2
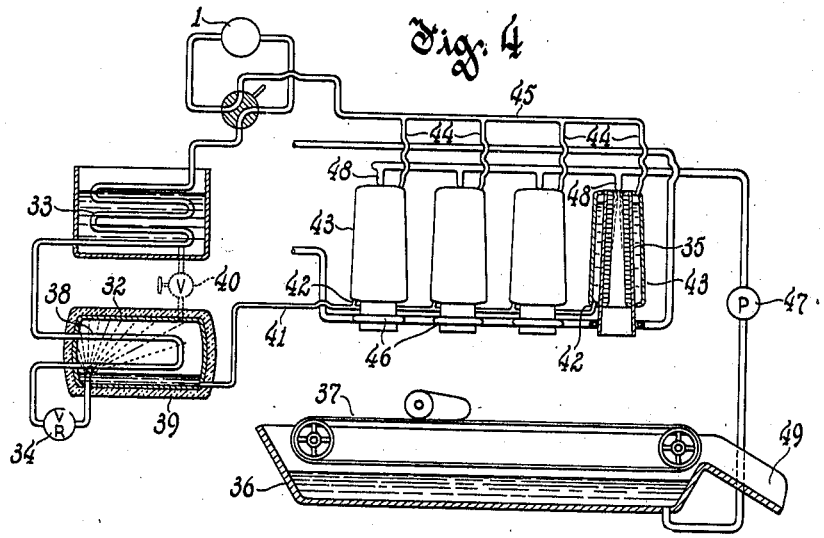
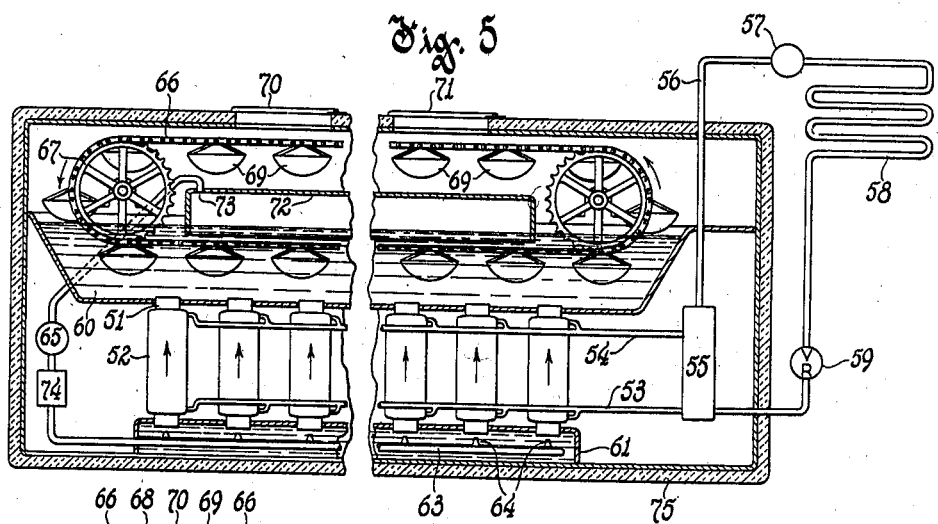
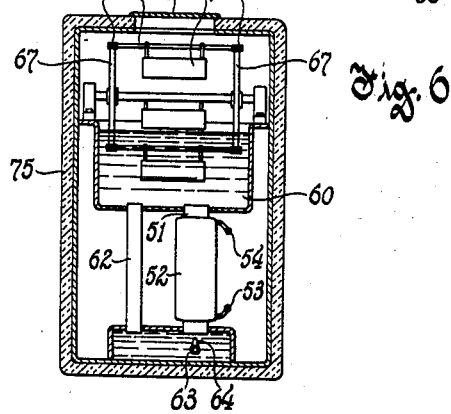
Inventors
Reinhard Wussow
Fritz W. Fechner
By Arthur Linden
Attorney Patented Nov. 12, 1940

2,221,212

UNITED STATES PATENT OFFICE 2,221,212

REFRIGERATING APPARATUS

Reinhard Wussow, Berlin-Charlottenburg, and Fritz W. Fechner, Hamburg, Germany

Application July 26, 1937, Serial No. 155,684
In Germany August 13, 1934

12 Claims. (Cl. 62—164)

This invention relates to a process and apparatus for the production of ice, or, for the cooling of a liquid to a low temperature, for the freezing of various substances. The apparatus comprises vertical heat-exchange or evaporator cells which are open at both ends and through which the refrigerant flows and which are immersed in a bath of the liquid to be cooled or frozen whereby in order to effect a rapid heat exchange the liquid to be cooled is vigorously agitated by injecting air or a part of the liquid to be cooled into the cells.

An object of the invention is to provide an evaporator comprising a plurality of separate, vertical freezing or cooling cells in the form of pressure-tight double tubes having an inner tubular space surrounded by a narrow annular jacket which latter forms an evaporating chamber for the refrigerating fluid.

A further object is to provide a plurality of evaporating cells, which are connected in multiple and also to an intermediate container for facilitating the flow of refrigerant liquid and vapor through the cells.

A further object is to provide the refrigerating or evaporating cells with heating means at their end to prevent ice formation thereon.

A further object is to provide common heat insulating means for the surfaces of the cells which are not in direct contact with the liquid to be cooled or frozen.

A further object is to provide means for reversing the flow of refrigerant through the freezing system.

Another object is to improve the heat efficiency of the combined heating and thawing process.

Another object is to provide a refrigerating system in which the formed ice blocks are quickly and efficiently freed.

Another object is to provide an efficient, continuous and simple system for the quick freezing of various substances.

Another object is to provide a system requiring a minimum of liquid refrigerant.

Another object is to provide a refrigerating system for the concentration of solutions by freezing.

Another object is to provide a system for the production of cooled fresh water from salt water or water containing other impurities.

Another object is to provide an ice making system in which the water to be frozen is sprayed into freezing tubes and removed therefrom by gravity.

Further objects and advantages will hereinafter appear.

Double-walled freezing cells for the production of ice are known, but since they were used only for the production of the ordinary blocks of ice, they had plane heat exchange surfaces which were therefore not capable of withstanding high pressures. In such cells cooled brine was therefore employed as the heat exchange medium between the evaporator and the freezing surfaces. These known freezing cells do not in any way resemble those of the present invention.

According to the invention, the evaporator cells, as already stated, are constructed in the form of double walled tubes with a narrow intervening evaporating space between the walls which requires only a small quantity of liquid refrigerant. Therefore the refrigerant flows through the intervening space at a relatively high velocity. This not only insures an intensive heat exchange but also permits the apparatus to be put into operation quickly and to adapt itself quickly to variations in the operating conditions. In the direct production of ice in these evaporator cells, which is particularly referred to hereinafter, the liquid refrigerant is periodically driven out of the evaporator into a separate intermediate container for the purpose of rapidly thawing off the ice. With the present system a relatively small intermediate refrigerant container is sufficient.

In order that the invention may be readily understood and carried into effect, it will now be described, by way of example, in greater detail, with the aid of the accompanying drawings, in which:

Fig. 4 illustrates a modification of the form of construction shown in Fig. 1, and Figs. 5 and 6 are two sections through an installation for rapidly freezing any desired substance.

Figure 1:
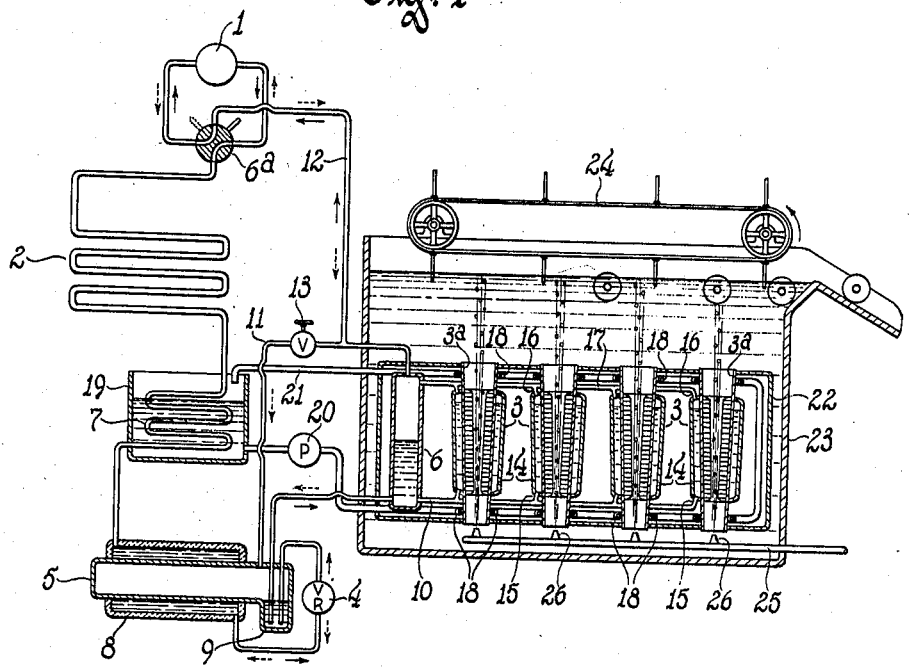
Figure 1 illustrates an ice producing plant in accordance with the invention.

Referring to Fig. 1 of the drawings, the numeral 1 designates a compressor, 2 a condenser, 3 a number of parallel connected evaporators, 4 a reducing valve connected between the condenser 2 and evaporators 3, and 5 an intermediate container arranged in the pipe line between the condenser 2 and the evaporators 3. A liquid separator 6 is connected in parallel with the evaporator system. During the freezing period the refrigerant vapor is drawn off from the top of said separator while its lower part is occupied by liquid refrigerant. The full line arrows near the refrigerant pipes indicate the direction of flow of the circulating refrigerant during the freezing periods, while the dotted arrows indicate the direction of flow during the period when the ice which has formed is thawed off the tubes. The direction of flow may be reversed by a valve 6ª. Interposed between the condenser 2 and the container 5 is a cooling coil 7 for further cooling the refrigerant which has been liquefied in the condenser 2. The intermediate container 5 is provided with a hollow insulating jacket 8 and the liquefied refrigerant from the condenser 2 flows during the refrigerating period through the jacket before it passes to the reducing valve 4. The intermediate container is further provided with a sump 9 to which the supply pipe to the reducing valve 4 leads, while another pipe leads to the evaporator 3, so that these pipes end near the bottom of the sump and they are always below the level of the liquid in the intermediate container.

To insure the flow of the liquid refrigerant from the evaporator 3 into the intermediate container 5 during the thawing off period the latter is arranged at a lower level than the evaporators. A header 10 connects the bottoms of the evaporators to which it is connected by branch nipples 15 with the separator 6 and a similar header 17 is provided and is connected to the upper vapor space of the intermediate container 5 by branch pipes 16 and also to the upper vapor space of the evaporators 3 and separator 6. A pipe 11 is connected, as shown in the drawings, to a suction pipe 12 which latter connects the separator 6 to the valve 6ª and which during the thawing off period becomes the pressure pipe. A shut-off valve 13 is provided which is closed during the freezing period. During the thawing period the valve 13 is opened, and the evaporator 3 and intermediate container 5 are therefore in communication, and the liquid flows by gravity from the evaporator 3 to the intermediate container 5 which is at a lower level.

The evaporators 3 are constructed in accordance with the invention as separate freezing cells consisting of double tubes between which is a narrow annular space, which space acts as the evaporating chamber. As shown in the drawings, the evaporator or freezing cells, which are open at both ends and are submerged in the bath of water to be frozen, are preferably each in the form of a tube 3ª which widens conically towards the top and is surrounded by a second tube 14 of slightly greater diameter. The annular spaces thereby formed between the tubes act as individual evaporators into the bottom of which the liquefied refrigerant is injected from the distributing header 10 through branch pipes 15 during the freezing period, while the evaporated refrigerant is drawn off at the top through the pipe branches 16 into the header 17.

In order to prevent the formation of ice over the edges of the cells, the freezing cells 3ª are extended upwardly and downwardly beyond the outer tubes 14. It has been found by experience that with this form of construction the blocks of ice freeze above the direct range of action of the evaporator owing to the conduction of heat through the walls of the cell. When the blocks are thawed off, heat must be conducted by a similar path but in the opposite direction to these extended portions for the purpose of releasing the ice. This delays the release of the blocks and the effect of the intermediate container which has been explained above would be neutralized.

In order to shorten the thawing-off period the extensions of the cells are heated in accordance with a further feature of the invention. This is effected, as shown in Fig. 1 by way of example, by means of heating pipes 18 which are arranged around the aforementioned extensions of the cells and which make metallic contact therewith. A relatively warm medium, for example cooling water, brine, or the like, is conducted through the pipes 18. As proven by experience, the thawing-off period is thereby reduced to a few minutes. The cold which is thereby conducted away is preferably recovered, being used, for example, for further cooling down the condensed refrigerant or the cooling water.

The regulation of the working temperature of this heating medium can be effected in a simple and economical manner as illustrated in Fig. 1. As has already been mentioned, an after-cooler 7 is connected behind the condenser 2 for the purpose of further cooling of the condensed refrigerant. This cooler is mounted in a vessel 19 which is partly filled with the brine which acts as the heating medium aforementioned. The brine may be drawn from the vessel by means of a pump 20 and circulated through the lower and upper heating or thawing pipes 18, and back again through the return pipe 21 to the vessel 19. The after-cooler 7 is only partly submerged in the brine in vessel 19. By varying the depth of immersion of the cooler 7, the area of the heat exchange surface in contact with the brine may be regulated. This in turn regulates the rate of heat exchange between the condensed refrigerant and the circulating brine, thereby regulating the average temperature of the latter. Instead of providing an after-cooler for cooling the condensed refrigerant after it leaves the condenser, a precooler for cooling the condenser water may be immersed in the brine vessel.

When the evaporator or cooling cells 3 of which, in the form described above, a number are combined to form larger evaporator units, are submerged in a body of liquid which is to be frozen or cooled, they are in accordance with the present invention enclosed in a common air insulating box 22 which effectively insulates the surfaces which are not used for the production of ice, in this case the outer surfaces, from the liquid body. Other elements of the system, such as the liquid separator 6, the distributing header 10, the collecting header 17, and the heating pipes 18, which have to be insulated from the bath, are also preferably enclosed in this common insulating box 22. By this means all these parts are effectively insulated from the cold bath, and the entire system forms a structurally simple unit, with a smooth exterior surface.

In Fig. 1, the reference numeral 23 designates the container for the liquid to be frozen or cooled, in which the complete evaporator unit 22 or several of such units, which are preferably constructed as single or double row sections, are inserted. Above the container 23 is a conveyor device 24, by which the blocks of ice, after they have been thawed off and risen to the surface of the bath where they float, can be removed. Below each evaporator row is an air distribution pipe 25 with a branch nozzle 26 below each evaporator cell. By means of these nozzles, air or liquid to be frozen, is blown into the cells during the freezing process for the purpose of producing a clear ice.

The operation of this device is as follows: During the freezing periods refrigerant vapor from the evaporator 3 and liquid separator 6 is drawn by the compressor 1 from the evaporators and forced into the condenser 2 where it is liquefied in a known manner. This liquefied refrigerant, after it has been further cooled in the cooler 7, passes through the annular jacket 8 of the intermediate container 5 and from there to the pressure reducing valve 4, from which it flows after expansion and corresponding cooling into the inner space of intermediate container 5. Since this space is heated by the condensed refrigerant flowing through the jacket, this cold liquid is partly vaporized, while the remaining liquid is forced through the pipe 10 from the sump 9 and only refrigerant vapor remains in the intermediate container 5.

If now the direction of flow of the refrigerant is reversed as indicated by the dotted arrows, refrigerant vapor is drawn by the compressor 1 from the condenser 2 and forced into the evaporator 3. This forces the liquid in the evaporator through the pipe 10 into the intermediate container 5. The liquid refrigerant in the container 5 is drawn off through the reducing valve 4 to the jacket space 8 and thence to the condenser 2. Since the pressure conditions between the intermediate container 5 and the jacket space 8 are now reversed, that is to say, the pressure in the jacket space is lower than that in the intermediate container 5, the temperature in the jacket space is also lower than that in the intermediate container and the vapor contained in the latter is therefore condensed at the colder walls of the jacket, and thus the whole of the supply of liquid is drawn or forced out of the evaporator 3 into the intermediate container 5.

The refrigerant vapor which the compressor 1 draws from the condenser during the thawing period and which now acts as an evaporator, is forced into the evaporator 3 and is condensed on the walls of the evaporator which are still at the temperature of the ice. Thus the evaporator now acts as a very effective condenser, until the blocks of ice are thawed off from the walls of the evaporator, whereupon the operation is again reversed for another freezing period.

Figure 2:
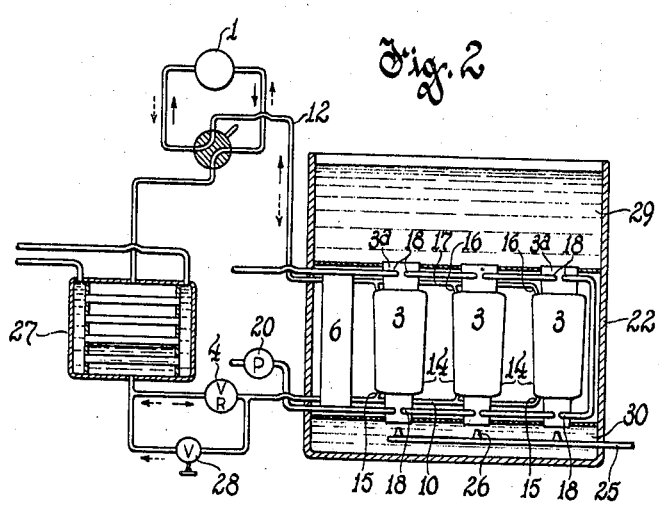
Figs. 2 and 3 illustrate a modification of the system shown in Fig. 1.
Figure 3:
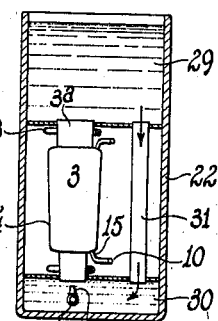

Figures 2 and 3 illustrates a longitudinal and a transverse section, respectively, through a form of construction which is especially suitable for smaller ice producing installations. In these figures the reference numerals which duplicate those of Fig. 1, designate the same parts as in Fig. 1. In the apparatus shown in these figures the necessity for a separate intermediate container is obviated by making the condenser volume so large, that it can receive the entire liquid content of the evaporator 3. For this purpose a tubular condenser 27 of sufficient volume and provided with cooling water tubes is employed, and no separate storage space for the cold liquid which is forced out of the evaporators during the thawing period is provided. In order to transfer the refrigerant liquid rapidly from the evaporators to the condenser after the apparatus has been reversed, a by-pass cock or valve 28 is connected in parallel with the reducing valve 4. When the apparatus is reversed for thawing off the ice, this valve is temporarily opened, so that the liquid is rapidly driven or sucked out of the evaporators 3 into the condenser 27. After the liquid has passed into the condenser, this valve 28 is again closed and the condensed refrigerant, which continues to flow from the evaporators during the thawing period, passes through the throttle or reducing valve 4 into the condenser 27. Similarly, of course, on reversing the apparatus for freezing, the cock 28 is temporarily opened in order to quickly drive the liquefied refrigerant, which is stored in the condenser, back into the evaporators, so that, after the connections have been changed, the regular freezing process begins.

The apparatus for producing ice or cold which is shown in Figs. 2 and 3 is considerably simplified. In this apparatus the side walls of the insulating box 22 are on the one hand extended upwardly so as to form above the freezing cells a receptacle 29 into the bottom of which the upper ends of the freezing cells open. In a similar manner the side walls of the insulating box are extended downwardly and these downward extensions are closed by a bottom so as to form a water box 30, connecting the lower ends of the cells. The upper receptacle 29 and the lower water box 30 are in communication through the freezing cells 3ᵃ. To accelerate the circulation of the water, especially when air injection is employed, supplemental return pipes 31 connecting the two water chambers 29 and 30 are provided.

Fig. 4 illustrates a further modification of an ice-producing plant in accordance with this invention. In this figure, 1 designates a compressor, 32 an intermediate container, 33 a condenser, 34 a reducing valve, 35 an evaporator or freezing cell, 36 is a water vessel arranged below the freezing cells and 37 is a conveyor device for carrying off the ice blocks.

The apparatus shown in this figure differs from the form shown in Fig. 1, in that for the heat exchange between the liquid leaving the condenser 33 and the intermediate container 32 a coiled pipe 38 is provided, which leads from the condenser 33 and passes through the interior space of intermediate container 32. The operation of this arrangement is substantially the same as that of the intermediate container 5 of Fig. 1. In order to prevent a heat exchange between the intermediate container 32 and the surrounding atmosphere, the former is covered with insulation 39. 40 is an additional shut-off valve which may be interposed between the vapor chamber of the intermediate container and the condenser 33 for accelerating the flow of the refrigerant liquid from the evporators 35 to the intermediate container 32 during the thawing period. This valve is not absolutely necessary and is therefore indicated in dotted lines.

Fig. 4 shows the freezing cells 35, which are connected by means of a header with the intermediate container 32. These cells are constructed in a manner similar to those aforedescribed but they differ from the cells shown in Figs. 1–3 in that they are not submerged in a bath of liquid to be frozen or cooled, but are located above the tray 36. The liquid to be frozen is sprayed into the upper ends of the cells against the inner walls thereof and trickles downwards and freezes to a greater or less extent to the walls. The cells widen out downwardly so that the blocks of ice formed therein, after being thawed off, fall into the tray by their own weight. Above the tray 36 into which the excess water which is not frozen flows from the cells, is a conveyor device 37 on to which the blocks of ice fall and by which they are carried away. A pump 41 lifts the liquid from the lower tray 36 and feeds it to the sprayers 48.

The operation of the apparatus illustrated in Fig. 4 is as follows:

The liquid refrigerant which during the freezing period flows from the intermediate container 32 through an inlet header 41 to the cells, enters these through branches 42 at the lower ends of the evaporator jacket 43, and the vapor produced therein is drawn off at the top by means of the separate suction pipes 44 into the collecting header 45 from where it is drawn back into the compressor 1. The cells are provided at their lower end with thawing pipes 46 through which a thawing medium, for example the cooling water for the condenser 33 flows, whereby it is at the same time precooled. The blocks of ice, which are deposited on the conveyor device 37, are carried to a chute 49 on which they may be conveyed to storage.

Fig. 5 illustrates a system for a rapid freezing process employing evaporator cells in accordance with the invention, and Fig. 6 is a transverse section of Fig. 5.

As is well known, perishable substances, particularly foods such as fish, meat, fruit, vegetables and the like, can be preserved especially well by freezing them rapidly down to a low temperature, because by this means their cellular structure is not destroyed.

In accordance with the invention, the method of rapid freezing is greatly improved as, by means of the evaporator cells which are open at both ends and into which air or liquid is injected through nozzles, a more intense heat exchange between the evaporating refrigerant and the liquid flowing through the evaporator cells takes place, than can be realized by other known means. Owing to the continuous rapid upward flow of the cooled liquid through the evaporator cells, an intensive withdrawal of heat from the material to be frozen is effected. This effect is further enhanced by conveying the material to be frozen through the liquid and over the evaporator cells, while liquid flows upward through the cells where it has been cooled to a very low temperature.

In Fig. 5 the numeral 51 designates the inner evaporator tubes, 52 are outer tubes which surround the former concentrically, the annular intermediate space again acting as the evaporator space. 53 is an inlet header and 54 is a collecting header for the refrigerant. Both pipes open into a liquid separator 55. From the separator a suction pipe 56 leads to a compressor 57 from which the compressed refrigerant passes to a condenser 58 and thence by way of a reducing valve 59 back to the liquid separator 55. From there the liquid passes through the inlet header 53 back to the evaporator cells 51. The upper ends of the evaporator tubes 51 open into a bath 60 located above, and their lower ends open into a liquid container 61. The latter is connected with the upper bath 60 by a return pipe 62 supplemental to evaporator pipe 51. Below the evaporator cells is located an air distribution pipe 63 provided with injection nozzles 64 below each evaporator cell. The air pipe 63 is fed with air under pressure by an air compressor 65.

Air is blown by the compressor 65 through the nozzles 64 into the separate evaporator cells, whereby a continuous and vigorous movement of the liquid in the directions indicated by the arrows is effected. As shown, the liquid flows upwardly through the evaporator tubes where it is cooled to a low temperature, and a corresponding quantity of liquid flows from the upper bath through the return pipes 62 back to the lower liquid container 61 to repeat the cycle.

A considerable number of evaporator tubes 51 are arranged in a row and one or more of such rows of tubes may be combined to form a unit. A conveying device is arranged above the series of tubes, said device being adapted to convey the material to be frozen. This device may be in the form of a conveyor belt of wire fabric. An especially suitable form of conveyor device is that shown in the drawings, consisting of conveyor chains 66 which are carried over chain pulleys 67 and from which wire baskets 69 are suspended by means of cross pieces 68. The conveyor device is arranged in such a manner that, at one end of the evaporator, the wire baskets 69 are lowered into the bath of freezing liquid and emerge again from it at the other end. The entire apparatus is enclosed in a heat-insulated compartment 75. The baskets 69 are filled from above, for example, through a door or flap 70 in the insulating cover, and are then carried in the direction indicated by the arrows above the evaporator cells and then through the cold liquid, so that the liquid which bubbles up out of the cells flows round them and cools them down very quickly. At the other end of the conveyor the baskets emerge again from the bath and the frozen contents may be taken out through a second flap 71 in the insulating enclosure. The speed at which the conveyor moves is preferably such that the material is frozen during a single passage through the bath.

At the low temperature of the liquid bath which is necessary, namely, a temperature of about —25 to —30° C. the danger exists that, if the air blast is not dried, the nozzle openings may be obstructed by ice which results from the moisture in the issuing air. To free the circulating air from its water content by cooling and drying would, however, require additional complicated apparatus. The necessity for this is avoided in accordance with the present invention by providing above the cooling bath and the evaporator cells a bell 72, the lower edges of which dip into the bath and thus form an air trap above the evaporator tubes. The air which is blown into the cells rises upwards through the tubes and is cooled down to the temperature of the bath and then collects under the bell 72 and is, therefore, not lost. This also reduces the absolute humidity of the air. A suction pipe 73 leads from the bell 72 to the air compressor 65. Finally, a drying trap 74 is connected behind the compressor 65 in order to absorb any residual moisture. By these means precipitation of moisture at the orifices of the nozzles 64 and, the resulting freezing up of the nozzles is prevented. A further possible method of avoiding the danger of freezing up of the nozzles is to substitute the cooling liquid itself for the air.

It has been found experimentally that pure or salt-free ice can be produced by means of the ice production installation which has been described, from water which is impure or which contains salt. If the final product is not to be ice but fresh water, then preferably, the heat of fusion of the ice produced is recovered or used in a condenser for liquefying the compressed refrigerant at a lower temperature and, therefore, lower pressure. In this case the already melted water is circulated over the melting ice by means of a pump and then passed through the condenser, so that the condensation of the refrigerant takes place at a temperature near 0° C.

A further use to which this ice production installation may be put is to concentrate solutions, fruit juices, vinegar or the like by freezing out the water. For this purpose, in accordance with the invention, the aqueous solutions, juices, etc., are frozen in the freezing cells and the resulting ice is cooled down to a low temperature. By this means a strong concentration of the solution enclosed in the ice is obtained, which is separated from the ice in its highly concentrated form, at this low temperature to avoid dilution after the ice has been broken.

What we claim as new and desire to secure by Letters Patent is:

1. Refrigerating apparatus of the class described, comprising, a plurality of evaporators, each comprising, a vertical freezing tube open at both ends and adapted to be entirely immersed in a body of liquid to be frozen, said freezing tube being enclosed by a concentric outer tube forming with the former a pressure-tight narrow expansion chamber for an evaporable refrigerant to be passed therethrough, said evaporators being arranged in a horizontal row, a liquid separator, inlet and outlet openings at the lower and upper ends, respectively, of said expansion chambers and said separator, said inlet openings and said outlet openings being connected by a common inlet and a common outlet header, respectively.

2. Refrigerating apparatus of the class described, comprising, a plurality of evaporators, each comprising, a vertical freezing tube open at both ends and adapted to be entirely immersed in a body of liquid to be frozen, said freezing tube being enclosed by a concentric outer tube forming with the former a pressure-tight narrow expansion chamber for an evaporable refrigerant to be passed therethrough, said evaporators being arranged in a horizontal row, a liquid separator, inlet and outlet openings at the lower and upper ends, respectively, of said expansion chambers and said separator, said inlet openings and said outlet openings being connected by a common inlet and a common outlet header, respectively, and a compartment jointly enclosing said evaporators, except for their lower and upper ends, said separator and said header.

3. Refrigerating apparatus of the class described, comprising, a plurality of evaporators, each comprising, a vertical freezing tube open at both ends and adapted to be entirely immersed in a body of liquid to be frozen, said freezing tube being enclosed by a concentric outer tube forming with the former a pressure-tight narrow expansion chamber for an evaporable refrigerant to be passed therethrough, said expansion chambers being arranged in a horizontal row, a liquid separator, inlet and outlet openings at the lower and upper ends, respectively, of said expansion chambers and said separator, said inlet openings and said outlet oenings being connected by a common inlet and a common outlet header, respectively, a container forming a heat insulating compartment jointly enclosing said evaporators, said separator and said headers, to reduce their heat absorption from their surroundings, the sides of said container being extended above its top surface and below its bottom surface to form chambers for receiving the liquid to be cooled, and a return conduit between said chambers for circulating said liquid to be cooled.

4. Refrigerating apparatus of the class described, comprising, a plurality of evaporators, each comprising a vertical cooling tube open at both ends and adapted to be entirely immersed in a body of liquid to be cooled, said cooling tube being enclosed by a concentric outer tube forming with the former a pressure-tight narrow expansion chamber for an evaporable refrigerant to be passed therethrough, said expansion chambers being arranged in a horizontal row, a liquid separator, inlet and outlet openings at the lower and upper ends, respectively, of said expansion chambers and said separator, said inlet openings and said outlet openings being connected by a common inlet and a common outlet header, respectively, a container surrounding said evaporators, said separator and said headers, the ends of said cooling tubes opening through opposite walls of said container, said container being adapted to reduce the heat absorption of said evaporators, said separator and said headers from their surroundings, means to pass air through said container, and means to employ the cooling effect of said air after it leaves said container.

5. Refrigerating apparatus of the class described, comprising, a plurality of evaporators, each comprising, a vertical freezing tube open at both ends and adapted to be entirely immersed in a body of liquid to be frozen, said freezing tube being enclosed by a concentric outer tube forming with the former a pressure-tight narrow expansion chamber for an evaporable refrigerant to be passed therethrough, said expansion chambers being arranged in a horizontal row, a liquid separator, inlet and outlet openings at the lower and upper ends, respectively, of said expansion chambers and said separator, said inlet openings and said outlet openings being connected by a common inlet and a common outlet header, respectively, and an intermediate refrigerant container connected to said separator and adapted to receive liquid refrigerant from said evaporators and said separator.

6. Refrigerating apparatus of the class described, comprising, a plurality of evaporators, each comprising, a vertical freezing tube open at both ends and adapted to be entirely immersed in a body of liquid to be frozen, said freezing tube being enclosed by a concentric outer tube forming with the former a pressure-tight narrow expansion chamber for an evaporable refrigerant to be passed therethrough, said expansion chambers being arranged in a horizontal row, a liquid separator, inlet and outlet openings at the lower and upper ends, respectively, of said expansion chambers and said separator, said inlet openings and said outlet openings being connected by a common inlet and a common outlet header, respectively, an intermediate refrigerant container arranged below the bottom level of said evaporators and adapted to store liquid refrigerant and having a sump, a condenser, a conduit between said condenser and said sump and a conduit between said sump and said inlet header, a conduit between said outlet header and said container, and a valve for closing said last named conduit during the freezing period.

7. Refrigerating apparatus of the class described, comprising, a plurality of evaporators, each comprising, a vertical freezing tube open at both ends and adapted to be entirely immersed in a body of liquid to be frozen, said freezing tube being enclosed by a concentric outer tube forming with the former a pressure-tight narrow expansion chamber for an evaporable refrigerant to be passed therethrough, said expansion chambers being arranged in a horizontal row, a liquid separator, inlet and outlet openings at the lower and upper ends, respectively, of said expansion chambers and said separator, said inlet openings and said outlet openings being connected by a common inlet and a common outlet header, respectively, an intermediate refrigerant container arranged below the bottom level of said evaporators and adapted to store liquid refrigerant and having a sump, a condenser, a conduit between said condenser and said sump, a conduit between said sump and said inlet header, a conduit between the top of said separator and said container, a valve for closing said last named conduit during the freezing period, and a liquid refrigerant cooler connected between said condenser and said intermediate refrigerant container and arranged in heat exchange relation to the latter.

8. Refrigerating apparatus of the class described, comprising, a plurality of evaporators, each comprising, a vertical freezing tube open at both ends and adapted to be entirely immersed in a body of liquid to be frozen, said freezing tube being enclosed by a concentric outer tube forming with the former a pressure-tight narrow expansion chamber for an evaporable refrigerant to be passed therethrough, said expansion chambers being arranged in a horizontal row, a liquid separator, inlet and outlet openings at the lower and upper ends, respectively, of said expansion chambers and said separator, said inlet openings and said outlet openings being connected by a common inlet and a common outlet header, respectively, a condenser including storage means adapted to receive the entire volume of refrigerant in said expansion chambers and said separator, and a connection between said condenser and the bottom of said liquid separator.

9. Refrigerating apparatus of the class described, comprising, a plurality of evaporators, each comprising, a vertical freezing tube open at both ends and adapted to be entirely immersed in a body of liquid to be frozen, said freezing tube being enclosed by a concentric outer tube forming with the former a pressure-tight narrow expansion chamber for an evaporable refrigerant to be passed therethrough, said expansion chambers being arranged in a horizontal row, a liquid separator, inlet and outlet openings at the lower and upper ends, respectively, of said expansion chambers and said separator, said inlet openings and said outlet openings being connected by a common inlet and a common outlet header, respectively, a condenser including storage means adapted to receive the entire volume of refrigerant in said expansion chambers and said separator, a connection between said storage means and said separator, an expansion valve in said last named connection, and a connection including a shut-off valve between said separator and said storage means.

10. Refrigerating apparatus of the class described, comprising, a plurality of evaporators, each comprising, a vertical freezing tube open at both ends and adapted to be entirely immersed in a body of liquid to be frozen, said freezing tube being enclosed by a concentric outer tube forming with the former a pressure-tight narrow expansion chamber for an evaporable refrigerant to be passed therethrough, the ends of said freezing tubes extending beyond said outer tubes, means to heat said ends to prevent ice from forming thereon, said last mentioned means comprising, conduits around said ends, condensing means for said refrigerant, means to pass a heating fluid through said jackets, and means to extract heat from the condensing means of the system and supply it to said heating fluid.

11. Refrigerating apparatus of the class described, comprising, a plurality of evaporators, each comprising, a vertical cooling tube open at both ends and adapted to be entirely immersed in a body of liquid to be cooled, said cooling tube being enclosed by a concentric outer tube forming with the former a pressure-tight narrow expansion chamber for an evaporable refrigerant to be passed therethrough, said expansion chambers being arranged in a horizontal row, a liquid separator, inlet and outlet openings at the lower and upper ends, respectively, of said expansion chambers and said separator, said inlet openings and said outlet openings being connected by a common inlet and a common outlet header, respectively, and means to pass a substance to be frozen through the liquid to be cooled in a path above the row of said evaporators.

12. Refrigerating apparatus of the class described, comprising, a plurality of evaporators, each comprising, a vertical cooling tube open at both ends and adapted to be entirely immersed in a body of liquid to be frozen, said cooling tube being enclosed by a concentric outer tube forming with the former a pressure-tight narrow expansion chamber for an evaporable refrigerant to be passed therethrough, said expansion chambers being arranged in a horizontal row, a liquid separator, inlet and outlet openings at the lower and upper ends, respectively, of said expansion chambers and said separator, said inlet openings and said outlet openings being connected by a common inlet and a common outlet header, respectively, means to pass a substance to be frozen through the liquid to be cooled in a path above the row of said evaporators, means to blow air through said freezing tubes, an air bell arranged above said evaporators and adapted to trap said air after its passage through said tubes, and means to recirculate said air.

REINHARD WUSSOW.
FRITZ W. FECHNER.